United States Patent [19]
Laubner et al.

[11] Patent Number: 5,497,835
[45] Date of Patent: Mar. 12, 1996

[54] COUPLING HOOK FOR THE LOWER STEERING ARMS OF A THREE-POINT ATTACHING DEVICE OF A TRACTOR

[75] Inventors: Joachim Laubner, Ahrweiler; Jürgen Vollmer, Lohmar; Klaus-Herbert Coenen, Hennef, all of Germany

[73] Assignee: GKN Walterscheid GmbH, Lohmar, Germany

[21] Appl. No.: 240,221

[22] Filed: May 10, 1994

[30] Foreign Application Priority Data

May 12, 1993 [DE] Germany .............. 43 15 811

[51] Int. Cl.⁶ ........................................... A01B 51/00
[52] U.S. Cl. .................................... 172/272; 280/508
[58] Field of Search .................... 172/272, 275; 280/508, 507, 510, 512

[56] References Cited

U.S. PATENT DOCUMENTS

| | | | |
|---|---|---|---|
| 4,014,562 | 3/1977 | Kunze | 280/508 |
| 4,071,263 | 1/1978 | Kunze | 280/508 |
| 4,108,464 | 8/1978 | von Allwörden et al. | 280/508 |
| 4,157,838 | 6/1979 | von Allwörden | 280/508 |
| 4,279,431 | 7/1981 | Schott | 280/508 |
| 4,366,967 | 1/1983 | Vollmer et al. | 172/272 |
| 5,050,684 | 9/1991 | Vollmer | 172/272 |

Primary Examiner—Terry Lee Melius
Assistant Examiner—Spencer Warnick
Attorney, Agent, or Firm—Harness, Dickey & Pierce

[57] ABSTRACT

A coupling hook 5 for a lower steering arm 3 of a three-point attaching device of a tractor has a hook member 6 with a locking catch 7 which is spring-loaded in the direction of the locking position. The locking catch 7 is arranged in a recess 12 of the hook member 6 and extends through an aperture 13 into the bearing recess 10 to receive a bearing ball 11. For the purpose of supporting and guiding the locking catch 7, the hook member 6 is provided with a first stop face 14 and a second supporting stop 15, arranged at a distance therefrom and offset towards the rear. In the locking position, the locking catch 7 is supported on the hook member 6 by means of a first supporting face 19, a second supporting face 21 and a blocking face 22. The assembly is designed in such a way that the second supporting face 21 and the blocking face 22 form part of a recess in the locking catch 7 and that contact between the blocking face 22 and the supporting stop 15 takes place beneath an imaginary connecting line 27 between the contact point between the locking face 25 of the locking catch 7 and the outer face 26 of the bearing ball 11, on the one hand, and the center 29 of the convex supporting stop 15, on the other hand. In this way, an improved locking effect is ensured.

10 Claims, 4 Drawing Sheets

COUPLING HOOK FOR THE LOWER STEERING ARMS OF A THREE-POINT ATTACHING DEVICE OF A TRACTOR

BACKGROUND OF THE INVENTION

The invention relates to a coupling hook, especially for the lower steering arms of a three point attaching device of a tractor. The coupling hook has a hook member and a locking catch which is pressurized towards the locking position by a closing spring and which may be moved into the open position by means to be connected thereto. The hook member includes a bearing recess which is open on one side and intended to be attached to the bearing ball of an implement. The coupling hook also includes a recess to accommodate the locking catch and an aperture to allow part of the locking catch to pass into the region of the bearing recess. A first stop face is provided by the aperture face above the locking catch and is arranged towards the open end of the bearing recess. A second supporting stop is arranged at a distance from the first stop face. Further included is means for securing the locking catch in the locking position. The locking catch, on its upper side, includes a first supporting face which cooperates with the first stop face. The two faces contact one another in the locking position in a contact point. On its underside, the locking catch includes a second supporting face cooperating with the second supporting stop, and means cooperating with the means for securing the locking catch in its locking position. Furthermore, at its front end, the locking catch engages the bearing recess, and includes the locking catch, an unlocking face, a stop for limiting the adjusting movement of the locking catch and a locking face for arresting the bearing ball in the bearing recess.

A coupling hook is described in DE 26 18 332 C2 which corresponds to U.S. Pat. No. 4,108,464. This reference illustrates a coupling hook where part of the locking catch is guided outwardly from a through-aperture and to which a cable is attached for actuating the locking catch. However, the locking catch is designed and supported relative to the locking stop in such a way that, if, under operational conditions, the locking catch is subjected to any kind of influences, for instance resulting from the bearing pin or branches or the like, it may open.

SUMMARY OF THE INVENTION

It is an object of the invention to provide a coupling hook which securely locks the bearing ball accommodated in the bearing recess of the coupling hook under all operating conditions. Also in those cases where the bearing ball carries out rotational movements or where, with the bearing ball in the coupled condition, external influences act on the unlocking face in the sense of applying an additional force on the locking catch for the purpose of moving it into the hook member, the coupling hook remains securely locked. Furthermore, even in the case of failure of the spring provided for moving the locking catch into the locking position, it is the purpose of the locking mechanism to securely hold the locking catch in the locking position.

In accordance with the invention, the second supporting stop of the hook member also serves as means for securing the locking catch in the locking position. The locking catch, on its underside, includes a recess which is open towards the underside and whose three delimiting faces form a blocking face, a second supporting face to secure and support the locking catch in the locking position, and a stop to limit the return movement of the locking catch towards the locking position. The second supporting stop of the hook member is provided with a face which is convex towards the blocking face of the locking catch. The blocking face of the locking catch contacts the convex face of the second supporting stop of the hook member beneath an imaginary connecting line between the possible contact point of the blocking face of the locking catch and the outer face of the bearing ball, on the one hand, and the center of the convex face of the second supporting stop, on the other hand. The blocking face, starting from the contact point between itself and the second supporting stop, towards the underside of the locking catch, projects downwardly from an imaginary circle, whose center is formed by the contact point between the first stop face of the hook member and the second supporting face of the locking catch, and extends through the contact point between the supporting stop of the hook member and the blocking face of the locking catch.

An advantage of this design is when the bearing ball is locked in the bearing recess of the coupling hook by the locking catch, any additional forces acting on the unlocking face from the outside cannot cause the locking catch to open. The reason for locking is, as a result of the selected supporting and pivot points, the locking catch has to carry out movement in the direction of the bearing recess in order to be transferred into the open condition. However, such space is occupied by the bearing ball so that, when the bearing ball is inserted, the locking catch cannot be opened by any forces acting on its unlocking face. On the contrary, when such forces occur with the bearing ball in its inserted position, the locking effect is intensified because the locking catch, together with the wedge-shaped gap formed between its blocking face and its supporting face, is pushed into closer contact with the second supporting stop. If any forces act on the locking face of the locking catch by means of the bearing ball, such forces are introduced by the first supporting face associated with the upper side of the locking catch into the first stop face of the hook member and additionally supported by the second supporting stop. Even if moments occur, these are additionally introduced into the second supporting stop of the hook member by the second supporting face at the underside of the locking catch.

The contact point between the blocking face of the locking catch and the second supporting stop is arranged such that the downwardly opening angle between the connecting line and a tangent in the connecting point between the blocking face and the convex face of the supporting stop is designed as an obtuse angle.

The second supporting stop of the hook member is preferably provided in the form of a tensioning pin inserted into the hook member. Alternatively, it is possible to provide a cylindrical pin made of a solid material. However, the hook member may also comprise a suitably shaped convex contour which forms the second supporting stop.

In a further embodiment of the invention, the closing spring acts on the locking catch such that its first supporting face is pressurized into contact with the first stop face of the hook member around the second supporting stop constituting the pivot axis. Preferably, even in the locking position of the locking catch a certain amount of play is provided between the locking face and the outer face of the bearing ball positioned in the bearing recess. Any normal loads do not cause a friction moment between the bearing ball and the locking catch.

According to a further embodiment of the invention, when the locking catch is opened by the bearing ball, its opening contour arranged on its underside between the locking face and the blocking face is slidingly supported on a control stop contour provided in the region of the aperture towards the bearing recess.

It is particularly easy to operate the assembly manually if there is provided an embodiment including an opening lever for the locking catch. A pivot pin is provided to pivotably connect the opening lever to the locking catch. One of the two parts, either the opening lever or the locking catch, is provided with a bore whereas the other part includes the pivot pin. As the opening lever is not secured to the hook member, the locking catch is supported entirely on the first stop face of the hook member and on the second supporting stop. To facilitate operation, the opening lever guided out of the hook member is provided with a supporting face by means of which, when operated, it is supported on a bearing face of the hook member along at least part of the opening path. The opening lever is either supported, or not supported, on the bearing face, depending on the direction from which tensile forces are applied to it.

If a coupling hook embodiment is provided which includes the possibility of arresting the locking catch in the open position, the opening lever is supported on the bearing face of the hook member by means of a first fixing stop or on an arresting stop of the hook member by means of a second fixing stop.

To be able to operate the locking catch from the tractor seat, for example, a cable is provided which either acts directly on the locking catch or on the opening lever.

In a further embodiment, the locking catch may be operated by a Bowden cable whose cable acts on the locking catch and whose sleeve is supported on the hook member.

From the following detailed description taken in conjunction with the accompanying drawings and subjoined claims, other objects and advantages of the present invention will become apparent to those skilled in the art.

BRIEF DESCRIPTION OF THE DRAWINGS

A preferred embodiment of the invention is diagrammatically illustrated in the drawing wherein.

DETAILED DESCRIPTION OF THE PREFERRED EMBODIMENT

Figure 1:
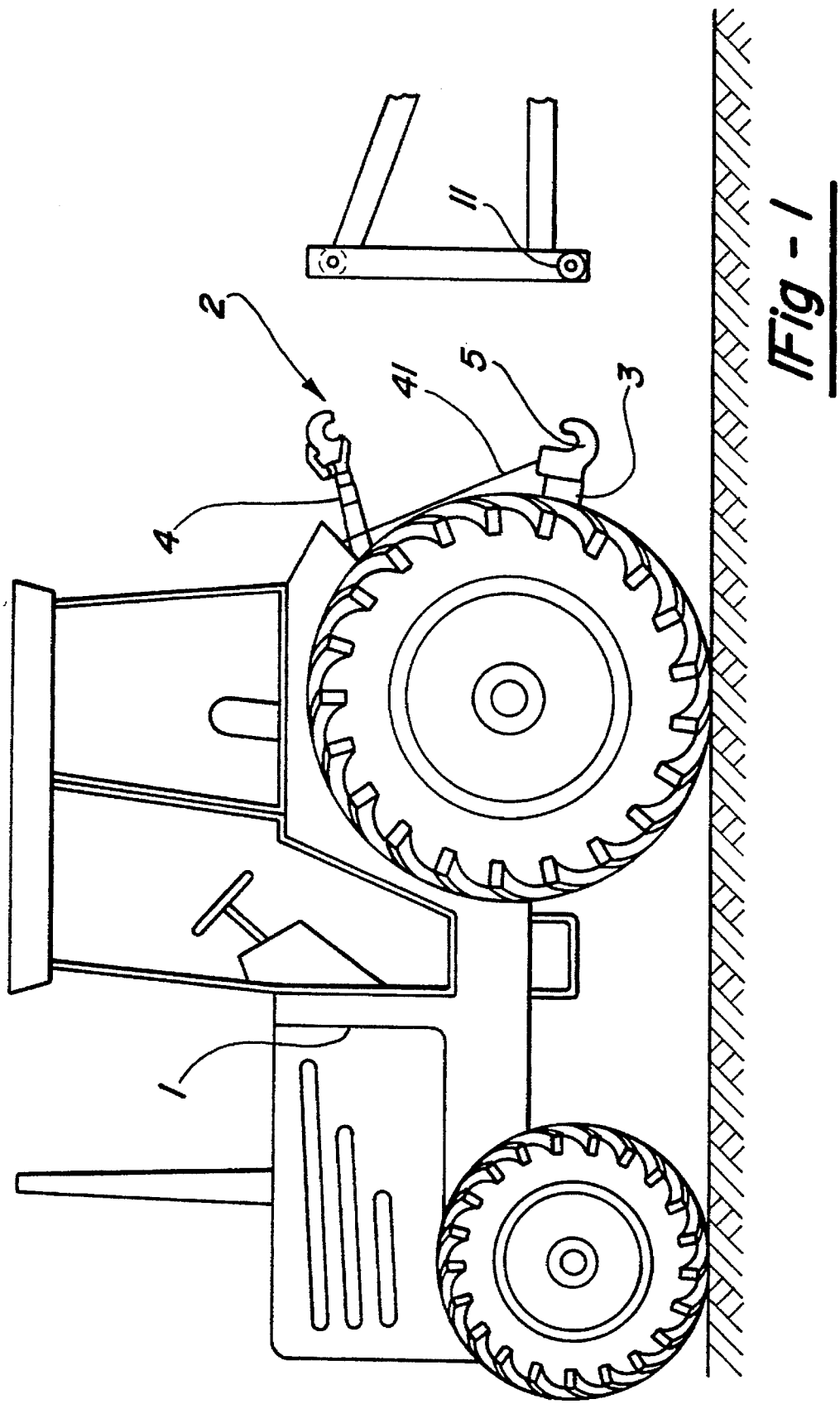
FIG. 1 is a diagrammatic view of a tractor having a three-point attaching device with a coupling hook, and an implement, not illustrated in greater detail, indicating its coupling points.

FIG. 1 shows a tractor 1 having a three-point attaching device 2 at its rear end. The three-point attaching device 2 includes two lower steering arms 3 which are arranged on one side of and at a distance from the longitudinal axis of the tractor 1 and one of which is visible. The upper steering arm 4 is arranged on the longitudinal axis of the tractor 1 above the two lower steering arms 3. The ends of the two lower steering arms 3 are provided with coupling hooks 5. The coupling hooks 5 serve to receive bearing balls 11 of an implement indicated by the coupling points in an as yet uncoupled position. The front end of the tractor 1 may be provided with a similar three-point attaching device. The design of the coupling hook 5 is shown in greater detail in FIGS. 2 to 4.

Figure 2:
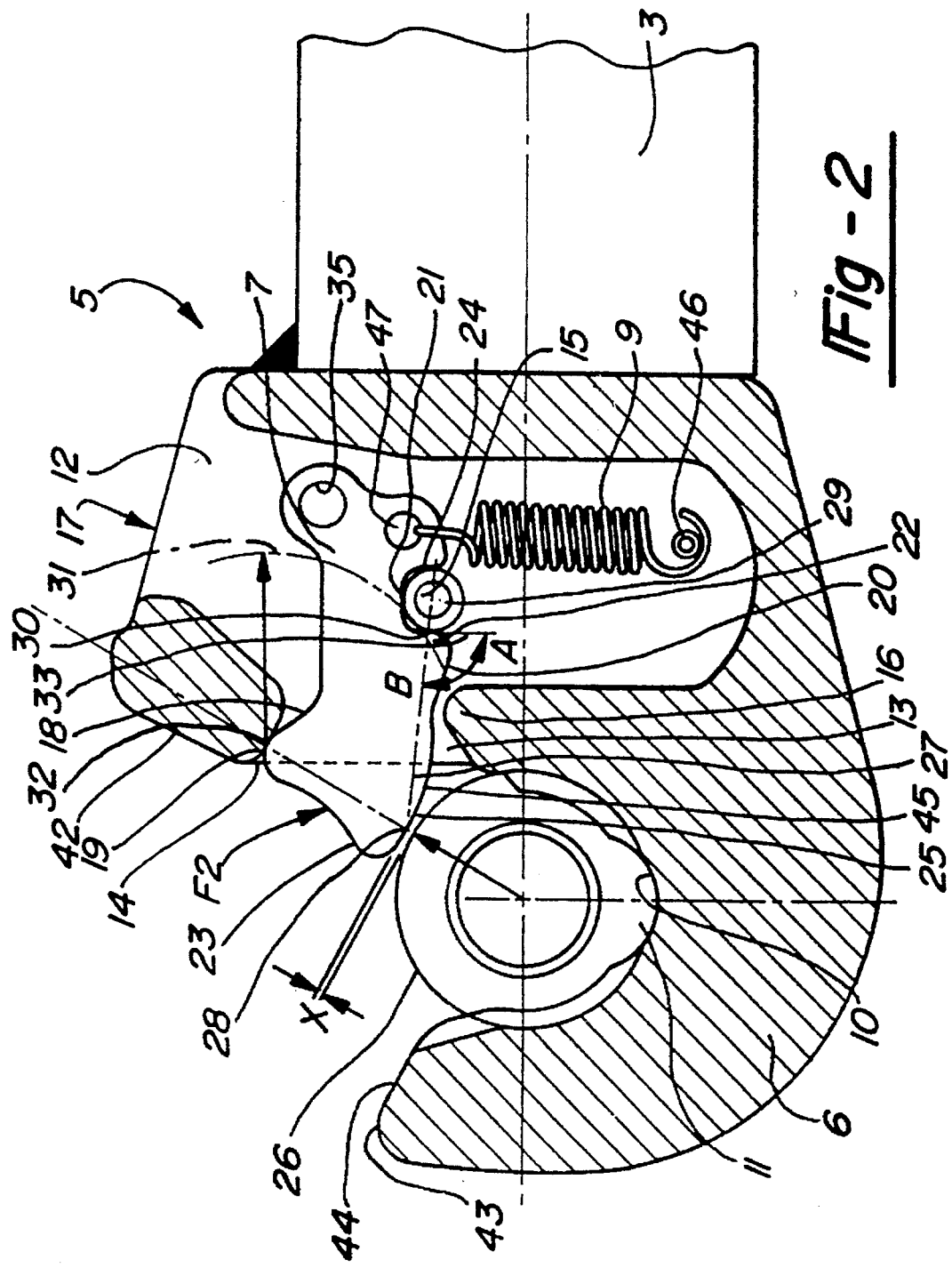
FIG. 2 is a side view, partially in section, of a coupling hook with the housing cover removed, with the locking catch in the locking position, but neither showing the operating cable nor the opening lever with cable.

FIG. 2 shows the arrangement of the coupling hook 5 relative to the lower steering arm 3. The coupling hook 5 includes a hook member 6 having an upwardly opening bearing recess 10. The bearing recess 10 serves to accommodate an externally spherical bearing ball 11 associated with the to be attached implement.

Figure 3:
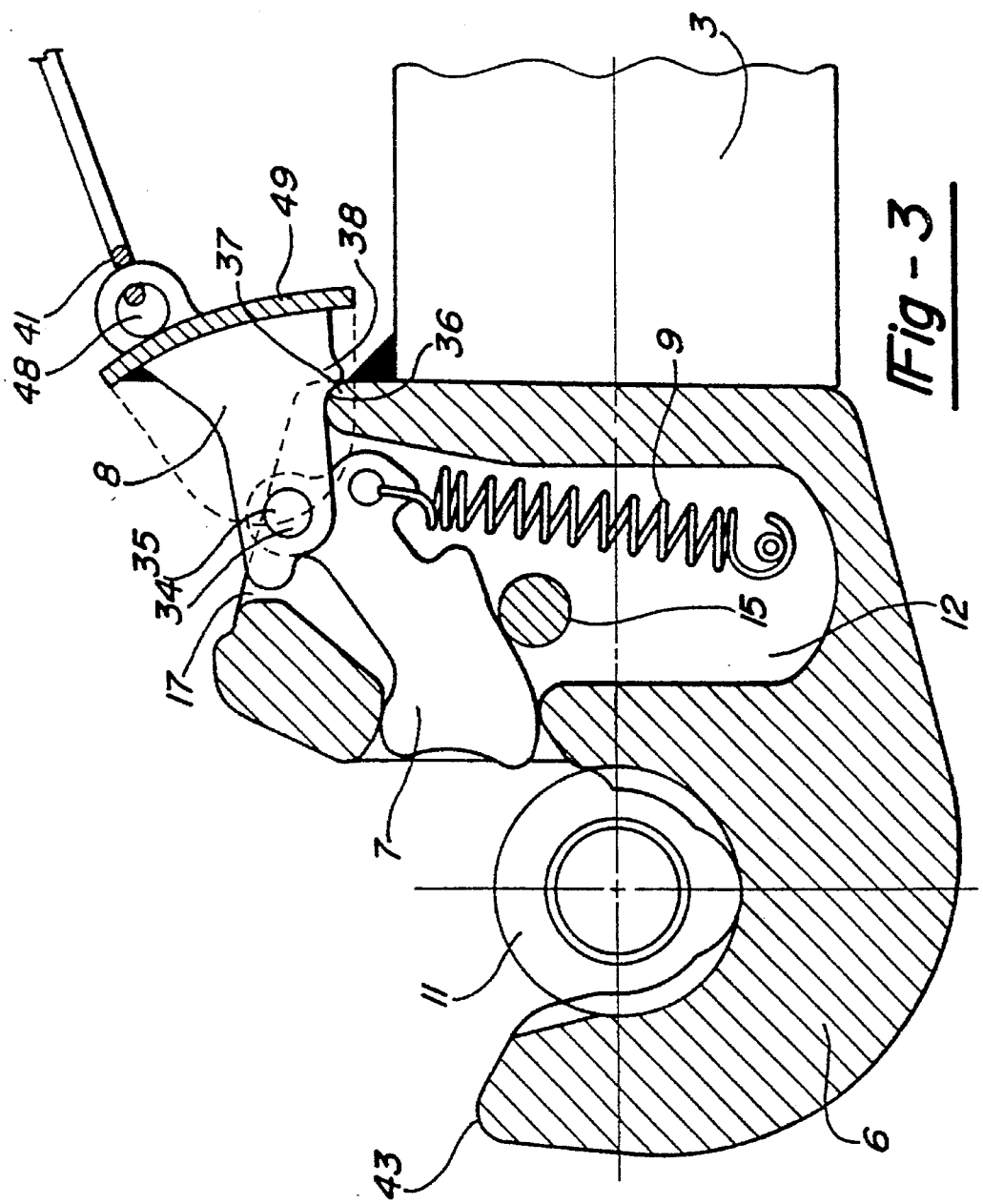
FIG. 3 is a view like FIG. 2 wherein the locking catch is in a position where it is opened manually by pulling the cable.
Figure 4:
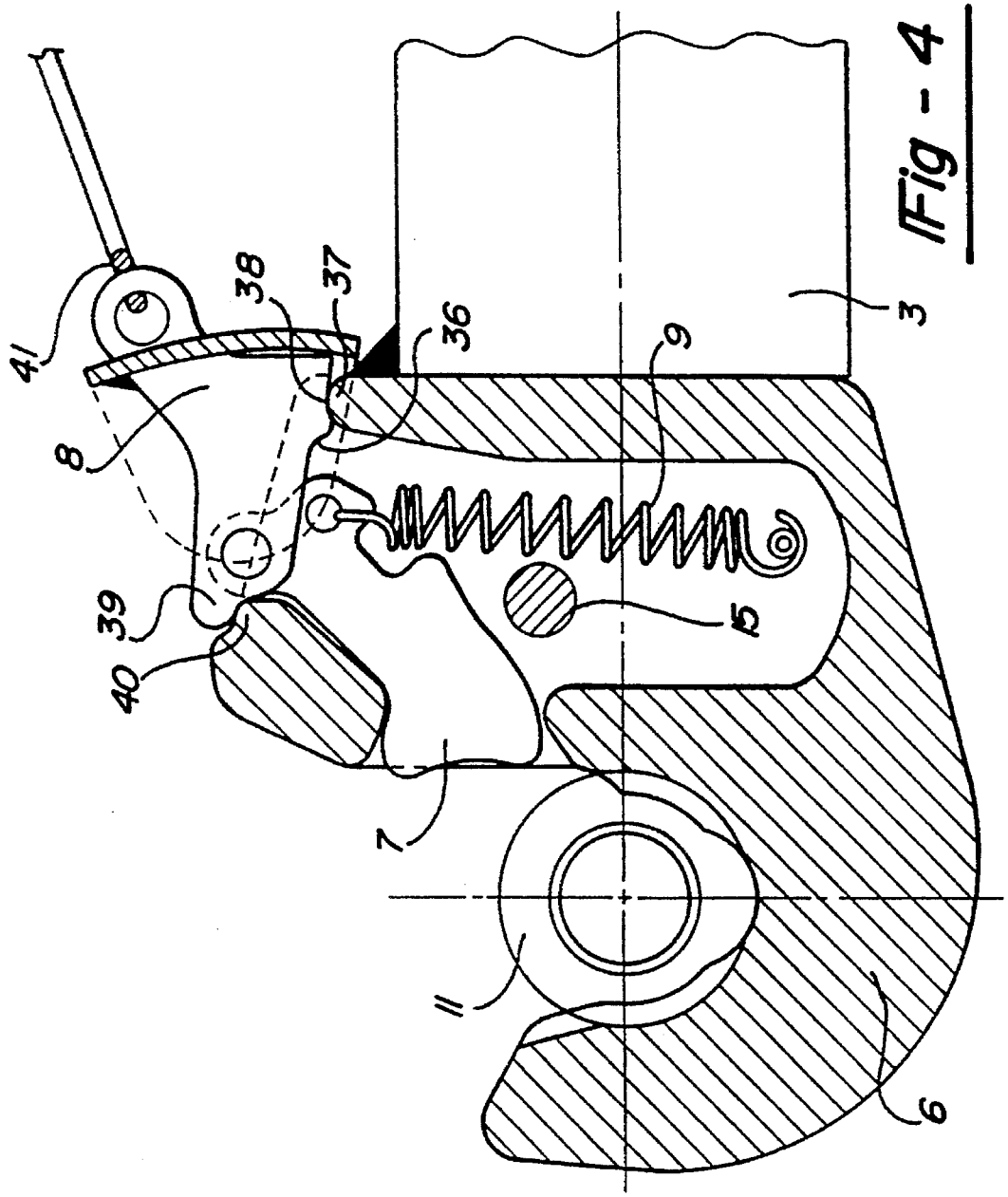
FIG. 4 is a view like FIG. 3, with the locking catch in an arrested open position.

Furthermore, the hook member 6 includes a recess 12 which includes an aperture 13 opening towards the bearing recess 10. The recess 12 receives a locking catch 7. In its position as illustrated in FIG. 2, the locking catch 7 partly extends into the opening region of the bearing recess 10. The delimiting wall above the locking catch, between the recess 12 of the hook member 6 in the region of the aperture 13 and the bearing recess 10 serves as a first stop face 14. At an axial distance from the first stop face 14, in the direction towards the lower steering arm 3, beneath the first stop face 14 and beneath the locking catch 7, the hook member 6 is provided with a second supporting stop 15. It is indicated by the tensioning pin engaging a corresponding bore in the hook member 6. However, the supporting stop 15 may also form part of the hook member 6 or may be a cylindrical pin as shown in FIGS. 3 and 4, respectively.

From the recess 12, there is provided an upwardly extending through-aperture 17 opening into the free environment. The locking catch 7 is supported and guided by the first stop face 14, the second supporting stop 15 and the control stop contour 16, arranged beneath the locking catch 7 in the aperture 13 of the hook member 6. On its upper side 18, the locking catch 7 includes a first supporting face 19 by means of which, in the locking position as illustrated in FIG. 2, it rests against the first stop face 14. On the underside 20 of the locking catch 7 a rectangular recess is provided which opens towards the underside 20 and which, in the locking position, accommodates the second supporting stop 15.

The inner face of the delimiting faces of the recess forms the second supporting face 21 to support the locking catch 7 on the second supporting stop 15 of the hook member 6. The lefthand limiting face of the recess of the locking catch 7, positioned towards the bearing recess 10 forms the blocking face 22. The blocking face 22 serves to secure and support the locking catch 7 in the locking position on the facing convex outer face of the second supporting stop 15. The righthand delimiting face of the recess of the locking catch removed from the bearing recess 10 serves as a stop 24 to limit the movement of the locking catch 7 in the bearing recess 10 by stopping against the supporting stop 15.

At the front edge projecting into the bearing recess of the locking catch, an inclined unlocking face 23 is provided which, towards the underside 20, is followed by the locking face 25 which, towards the recess, changes into the curved opening contour 45. The locking catch 7 serves to lock the bearing ball 11 in the bearing recess 10 of the hook member 6. As a result of the outer face 26 of the bearing ball 11 stopping against the locking face 25, the bearing ball 11 is prevented from sliding out. A closing spring 9 designed as a tensioning spring and the second supporting stop 15 pressurize the locking catch 7 towards the right into the closed position as illustrated in FIG. 2, so as to be offset from the bearing recess 10.

When the locking catch 7 is closed and supported on its underside 20, the closing spring 9 generates a clockwise moment in the supporting stop 15, which moment causes the locking catch 7, with its upper side 18 and its first supporting face 19, to establish contact with, and be held by, the first supporting face 14 of the hook member in the contact point 32. The blocking face 22 extends in such a way that the mutual contact point 30 between the blocking face 22 and the second supporting stop 15 is positioned beneath an imaginary connecting line 27. The connecting line 27 extends from the contact point 28 between the locking face 25 and the outer face 26 of the bearing ball 11, when the faces contact one another, to the center 29 of the convex second supporting stop 15 of the hook member 6. From here, the blocking face 22 extends to the underside 20 of the locking catch 7 such that it projects from an imaginary circle 31 around the contact point 32 between the first stop face 14 of the hook member 6 and the first supporting face 19 of the locking catch 7. The hatched area B shown in FIG. 2 and positioned outside the circle 31 causes positive locking. This area ensures that when the locking catch 7 is pressurized while the bearing ball 11 is enclosed in the bearing recess 10, as shown in FIG. 2 and a force is applied to the unlocking face 23, the locking catch 7 cannot move into the open position. When the locking catch 7 is pressurized, the blocking face 22 of the locking catch 7 is pushed into closer contact with the supporting stop 15. The supporting stop 15 is thus wedged inbetween the second supporting face 21 and the blocking face 22 of the locking catch 7, thereby generating a safety locking effect which maintains the locked position even if the spring 9 fails.

The contact point 30 may also be arranged such that, between the connecting line 27 and a vertical tangent line 33 through the contact point 30 with the blocking face 22, an obtuse angle A is obtained.

One end of the spring 9 is suspended on a pin 46 attached to the hook member 6 or on a suitable projection of the hook member 6. The other end of the spring 9 is suspended in an aperture of the locking catch 7.

If in the case of the position as illustrated in FIG. 2, an external force were applied to the unlocking face 23, the locking pin 7 would pivot downwardly around the second supporting stop 15. However, it is unable to do so since it is prevented from doing so by the outer face 26 of the enclosed bearing ball 11. A securing function is also exercised by the projecting blocking face B which prevents the locking catch 7 from pivoting away from the supporting stop 15 after the locking catch 7 contacts the outer face 26 of the bearing ball 11. By positioning the blocking face B in front of the second supporting stop 15 provided in the form of a tensioning pin in the direction of the bearing ball 11, there is no sensitivity to tolerances relative to the gap dimension X between the bearing ball 11 and the locking catch 7. If the locking catch 7 rotates around the second supporting stop 15 when an external force F2 acts on the unlocking face 23, the described angle A remains constant until the underside 20 of the locking catch 7 is supported on the control stop contour 16 located between the supporting stop 15 and the bearing recess 10. However, this is not possible because the rotational angle required for this operation is greater than the rotational angle achievable when the bearing ball 11 is in the inserted position. Before it can be opened, the locking catch 7 has to enter positively the space taken up by the bearing ball.

If the bearing ball 11 applies an upwardly directed force F1 and at the same time a clockwise moment to the locking catch 7, the angle A and the blocking face B prevent the locking catch from moving past the supporting stop.

When the implement is coupled automatically, the bearing ball 11 is guided by the guiding face 44 starting from the hook point 43 or by the starting shoulder 42 to the point of the unlocking face 23. An anti-clockwise tilting moment is applied to the locking catch 7 around the second control stop 15. The locking catch 7 enters the bearing recess 10 as far as the control stop contour 16, and as a result of the moment applied to this control stop contour 16 around the control stop 16, the locking catch 7 is pivoted out of the recess and past the blocking face 22. By means of its opening contour 45 provided at its underside 20, the locking catch 7 slides on the front control stop contour 16 and on the supporting stop 15 into the bearing recess 10. The returning force of the closing spring 9 is such that the locking catch 7 is subjected to a clockwise moment which ensures that the locking catch 7 is always supported on the second supporting stop 15 on the one hand and on the first stop face 14 of the hook member 6 on the other hand. This design measure clearly improves the closing behavior of the locking catch 7, especially if the bearing balls 11 have a rough surface due to rust or dirt.

For manually moving the locking catch 7 into the open position, an opening lever is provided attached to a cable, as described in connection with FIG. 3. In the case of the embodiment according to FIG. 3, an opening lever 8 is additionally attached to the locking catch 7. For attaching purposes, the opening lever 8 is provided with a bore. The opening lever 8 embraces the locking catch 7 like yoke jaws and is also provided with a bore. A pivot pin 34 passes through the bore 35 of the opening lever 8 and through the bore 35 of the opening lever 8 and through the bore 35 of the locking catch 7. Furthermore, the part of the opening lever 8 projecting from the through-aperture 17 of the hook member 6 is provided with a cover for covering the through-aperture 17 when the locking catch 7 is in the closed condition, and with a fixing bore 48 for fixing the cable 41.

In the boundary region of the through-aperture 17, the hook member 6 includes a round bearing face 37 on which the opening lever 8 is supported by means of a correspondingly shaped fillet-like supporting face 36, while pulling on the cable in a correspondingly inclined direction. The opening lever 8 also pivots around the bearing face 37. In the process, the locking catch 7, starting from the closed position as illustrated in FIG. 2 is moved into the open position according to FIG. 3, and because of its pivot movement, its blocking face 22 moves away from the second supporting stop 15. The locking catch 7 releases the bearing ball 11.

The free support of the opening lever 8 in the recess 12 permits a horizontal pulling direction, with the opening lever 8 then acting like a tilting lever. It also permits a forward pulling direction towards the hook point, with the opening lever 8 then being used as a chain member. There is thus provided a very large operating angle for operating the cable. The opening lever 8 is firmly connected to a hinged asymmetric cover 49. In consequence, the opening lever 8 is prevented from being opened by external influences such as tire contact.

FIG. 4 shows the locking catch 7 in the arrested position into which it was moved manually from the position as shown in FIG. 3. In the region adjoining its supporting face 36, the opening lever 8 includes a first fixing stop 38 which is set back. The opening lever 8 also includes a second fixing stop 39 which is offset from the first fixing stop 38 and which cooperates with the arresting stop 40 located in the region of the through-aperture 17 in the hook member 6 and positioned opposite the bearing face 36.

If the opening lever 8 is pivoted further to the right from the open position according to FIG. 3, its second fixing stop 39 may be made to rest on the arresting stop 40 of the hook member 6 and its first fixing stop 38 may rest on the bearing face 37 of the hook member 6.

While the above detailed description describes the preferred embodiment of the present invention, the invention is susceptible to modification, variation, and alteration without deviating from the scope and fair meaning of the subjoined claims.

We claim:

1. A coupling hook for lower steering arms of a three-point attaching device of a tractor, comprising:

a hook member, a locking catch coupled with said hook member which is pressurized towards a locking position by a closing spring and which may be moved into an open position by means to be connected thereto, said hook member including a bearing recess which is open on one side and intended to receive a bearing ball of an implement to be attached;

a recess in said hook member for accommodating the locking catch;

an aperture in said hook member for allowing part of the locking catch to pass into the region of the bearing recess;

a first stop face on said hook member, said first stop face provided by said aperture above the locking catch and arranged towards an open end of the bearing recess;

a second supporting stop coupled with said hook member and arranged at a distance from said first stop face;

the locking catch, on its upper side, including a first supporting face cooperating with said first stop face, said first supporting and first stop faces contact one another in a locking position at a contact point; said locking catch, at a front end extending into the bearing recess, including an unlocking face, and a locking face for arresting the bearing ball in the bearing recess; said second supporting stop of the hook member cooperating with said closing spring for securing the locking catch in the locking position;

said locking catch, on its underside, including a recess open towards the underside of the locking catch cooperating with said second supporting stop, said recess including three delimiting faces which form a blocking face, a second supporting face for securing and supporting the locking catch in the locking position, and a stop for limiting the return movement of the locking catch towards the locking position;

said second supporting stop of the hook member including a face which is convex towards the blocking face of the locking catch recess said blocking face of the locking catch recess contacts said convex face of the second supporting stop of the hook member beneath an imaginary connecting line between a possible contact point of the locking face of the locking catch and the outer face of the bearing ball, on the one hand, and the center of the second supporting stop, on the other hand;

said blocking face, extending downwardly from a contact point between itself and the second supporting stop and beyond an imaginary circle whose center is formed by the contact point between the first stop face of the hook member and the first supporting face of the locking catch.

2. A coupling hook according to claim 1, wherein an angle, which opens downwardly between the connecting line and a vertical tangent line through the contact point between the blocking face and the locking stop, is an obtuse angle.

3. A coupling hook according to claim 1, wherein the supporting stop of the hook member is formed by a cylindrical pin, a tensioning pin or a suitable contour of the hook member.

4. A coupling hook according to claim 1, wherein the locking catch is acted upon by said closing spring which, around the second supporting stop, pressurizes the locking catch such that its first supporting face comes to rest against the first stop face of the hook member.

5. A coupling hook according to claim 1, wherein when the locking catch is opened by the bearing ball, an opening contour arranged on its underside of the locking catch between the locking face and the blocking face is slidingly supported on a control stop contour provided in the region of the aperture towards the bearing recess.

6. A coupling hook according to claim 1, wherein in the locking position of the locking catch, a certain amount of play is provided between the locking face of the locking catch and an outer face of the bearing ball.

7. A coupling hook according to claim 1, wherein an opening lever is pivotably connected to the locking catch by means of a pivot pin.

8. A coupling hook according to claim 7, wherein the opening lever guided out of the hook member is provided with a supporting face by means of which, when actuated, it is supported on a bearing face of the hook member along at least part of the opening path.

9. A coupling hook according to claim 7, wherein in an arrested open position, the opening lever is supported on a bearing face of the hook member by means of a first fixing stop face and on an arresting stop of the hook member by means of a second fixing stop.

10. A coupling hook according to claim 7, wherein a cable is secured to the locking catch or to the opening lever.

* * * * *